United States Patent
Christiansen (10) Patent No.: US 8,024,867 B2
(45) Date of Patent: Sep. 27, 2011

(54) TAPE MEASURE CALIBRATOR

(75) Inventor: Douglas J. Christiansen, Lindon, UT (US)

(73) Assignee: Douglas J. Christiansen, Lindon, UT (US)

( * ) Notice: Subject to any disclaimer, the term of this patent is extended or adjusted under 35 U.S.C. 154(b) by 151 days.

(21) Appl. No.: 12/504,922

(22) Filed: Jul. 17, 2009

(65) Prior Publication Data

US 2010/0018068 A1    Jan. 28, 2010

Related U.S. Application Data (60) Provisional application No. 61/082,829, filed on Jul. 23, 2008.

(51) Int. Cl.
*G01B 3/10* (2006.01)

(52) U.S. Cl. ........... 33/502; 33/770; 33/759; 33/567; 33/494

(58) Field of Classification Search .......... 33/502, 33/545, 567, 755, 757–760, 768, 770, 668, 33/484, 485, 494; D10/71, 72, 74
See application file for complete search history.

(56) References Cited

U.S. PATENT DOCUMENTS

| | | | | |
|---|---|---|---|---|
| 1,732,906 A | * | 10/1929 | Morton | 33/490 |
| 2,591,333 A | * | 4/1952 | Bellmer | 33/770 |
| 4,033,041 A | * | 7/1977 | Allums | 33/759 |
| 4,864,734 A | * | 9/1989 | Woodard et al. | 33/428 |
| 4,930,227 A | | 6/1990 | Ketchpel | |
| 5,113,596 A | * | 5/1992 | Meyers | 33/770 |
| 5,430,952 A | | 7/1995 | Betts | |
| 5,435,074 A | | 7/1995 | Holevas et al. | |
| 6,094,833 A | * | 8/2000 | Medley, Jr. | 33/770 |
| 6,338,204 B1 | | 1/2002 | Howle | |
| 6,880,260 B2 | | 4/2005 | Baida | |
| 7,299,565 B2 | | 11/2007 | Marshall et al. | |

* cited by examiner

*Primary Examiner* — Amy Cohen Johnson
(74) *Attorney, Agent, or Firm* — R. Camden Robinson; VanCott, Bagley, Cornwall & McCarthy P.C.

(57) ABSTRACT

A tape measure calibrator includes a base with a first reference surface and a second reference surface. A pull calibration mark is made on the base which indicates a first distance from the first reference surface. A push calibration mark is also made on the base which indicates a second distance from the second reference surface, in which the first distance and the second distance are substantially equal.

13 Claims, 11 Drawing Sheets

TAPE MEASURE CALIBRATOR

RELATED DOCUMENTS

The present application claims the benefit under 35 U.S.C. §119(e) of U.S. Provisional Application No. 61/082,829, filed Jul. 23, 2008, which is incorporated herein by reference in its entirety.

BACKGROUND

A tape measure is a flexible form of ruler. The tape measure consists of a ribbon of cloth, plastic, or metal with linear-measure markings, often in both imperial and metric units. Tape measures designed for carpentry or construction often use a stiff, curved metallic ribbon that can remain stiff and straight when extended, but retracts into a coil for convenient storage. A tape measure of 3 to 100 feet can wind into a relatively small housing. This type of tape measure will have a floating end hook to aid in measuring. The end hook consists of a tang and a hook. The tang is designed to float a distance equal to the hook's thickness, to provide both inside and outside measurements that are accurate.

In many instances, measurement accuracy is essential to creating a quality finished product. For example, in cabinet-making, a series of 1/16" errors in cutting 8 pieces could result an assembled cabinet which is 1/2" too large or 1/2" too small. The combined discrepancies add up to significant errors. A set of cabinets that are 1/2" too big won't fit the opening they were designed for, thus causing loss of time and money to modify or remake the cabinets.

The accuracy of tape measures is particularly important when several tape measures are being used by different people or at different locations. For example, a cabinetmaker makes a cabinet door, then orders glass to fit it using a tape measure. The glass company cuts glass for the same cabinet door using their tape measure. If one or the other has not used an accurate tape measure, the glass will not fit in the door as designed.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

Accuracy is the degree of conformity of a measured or calculated quantity to its true value. Precision or repeatability is the degree to which a number of measurements or calculations show the same or similar results. The results of a measurement can be accurate but not precise, precise but not accurate; neither; or both. The measurement is valid if it is both accurate and precise.

To determine if a measuring device makes valid measurements, a standard with a known dimension can be used. The measuring device is used to measure the standard and the resulting measurement compared to the known dimension of the standard. If the measurement produced by the measurement device is substantially equivalent to the known dimension and the measurement is repeatable, it can be assumed that measurement device is calibrated to make valid measurements of that particular dimension.

In one of many possible embodiments, the present illustrative apparatus provides for both pull and push calibrations of a tape measure and adjustment of the hook geometry to bring a tape measure back into calibration. The tape measure then generates more accurate and precise measurements.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
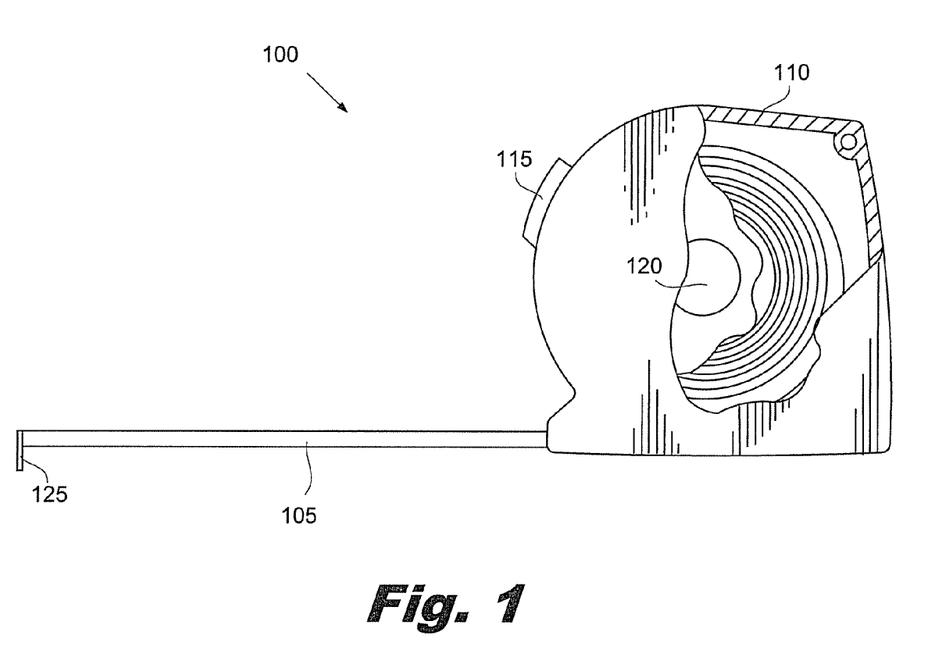
FIG. 1 is a partially cut away view of an illustrative tape measure, according to one embodiment of principles described herein.

FIG. 1 is a partially cutaway side view of one embodiment of a tape measure (100). The tape measure (100) is comprised of a flexible tape (105), which is configured to be retracted and extended from a housing (110). According to one illustrative embodiment, the flexible tape has a concave cross section and linear graduations along its length. In its stowed position, the flexible tape is coiled around a reel (120) within the housing (110). The flexible tape (105) terminates with an end hook (125). The end hook (125) is used to contact an edge or surface, which serves as a reference plane during a measurement. A lock (115) can be depressed to prevent the retraction or extension of the flexible tape (105) from the housing (110).

Figure 2A:
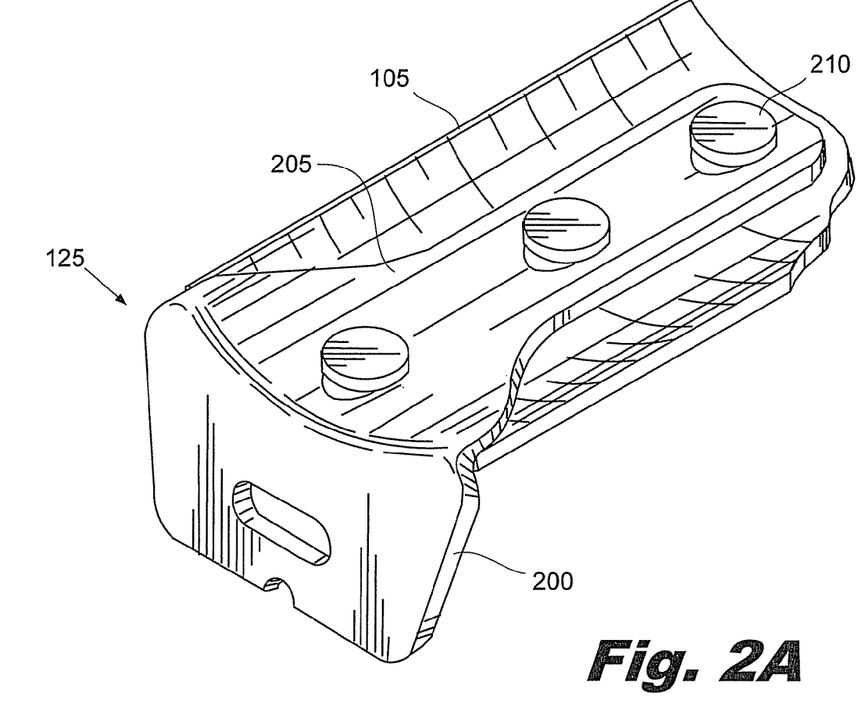
FIGS. 2A and 2B illustrate a perspective view and a top view, respectively, of an illustrative tape measure end hook, according to one embodiment of principles described herein.
Figure 2B:
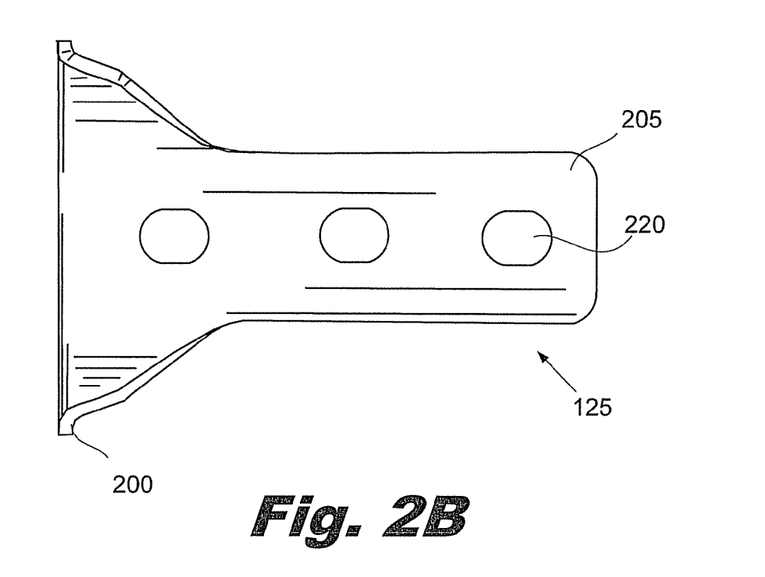

FIGS. 2A and 2B illustrate a perspective view and a top view of a tape measure end hook (125) and the tang of the end hook (205). According to one exemplary embodiment, the tape measure end hook (125) has a tang (205) that extends axially along the flexible tape (105) and a hook (200), which extends perpendicularly from the tang (205) and overlies the outer edge of the flexible tape (105). A number of rivets (210) pass through elongated holes in the tang (205) of the end hook (125) and slidably fasten the end hook (125) to the flexible tape (105). As used in the specification and appended claims the term "slidably" refers to a loose attachment that allows precision linear movement. FIG. 2B shows a top view of the tape measure end hook (125), which shows the elongated holes (220) through which the rivets (210) pass.

Figure 3A:
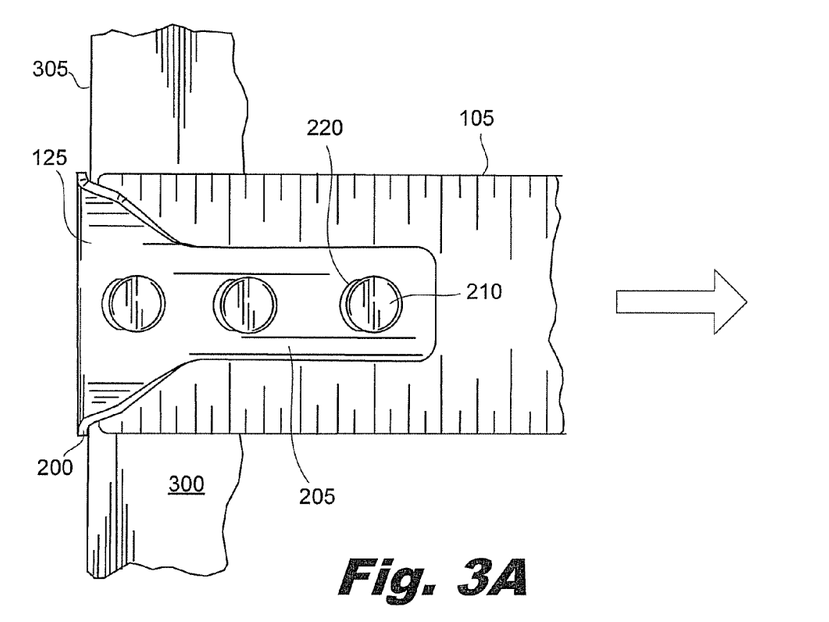
FIGS. 3A and 3B illustrate a top and a side view, respectively, of an illustrative tape measure making a pull measurement, according to one embodiment of principles described herein.
Figure 3B:
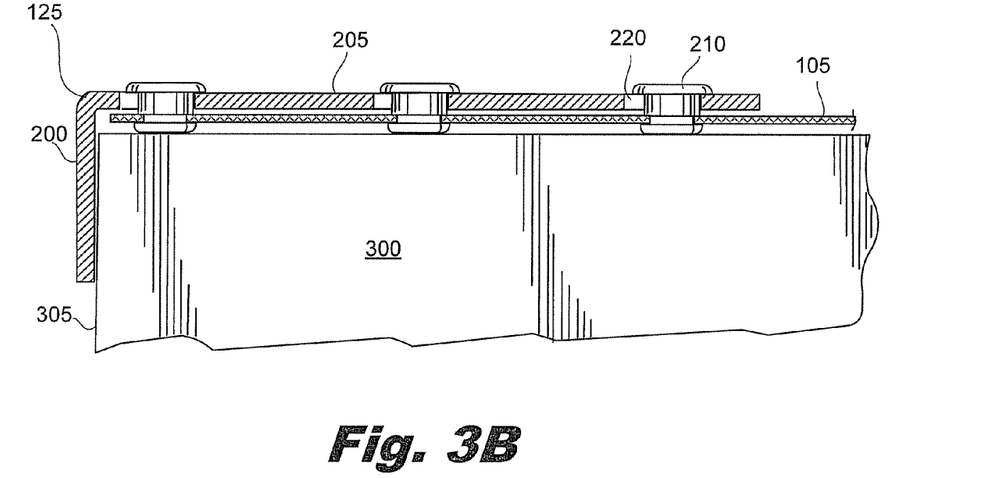

FIGS. 3A and 3B illustrate a top and a partially cut-away side view, respectively, of a tape measure making a pull measurement. In a pull measurement, the end hook (125) is placed over the edge of a block (300). The inner surface of the hook (200) contacts a reference surface (305) of a block (300). The flexible tape (105) is pulled axially away from the reference surface to ensure that the hook (200) firmly contacts the reference surface. The rivets (210) slide within the elongated holes (220) in the tang (205) until the rivets (210) contact a first end of the elongated holes. The end hook (125) is then fully extended with respect to the flexible tape (105). In this position, the tape measure (100) is designed to make a pull measurement from the reference plane (305) to any point along the flexible tape (105).

Figure 4A:
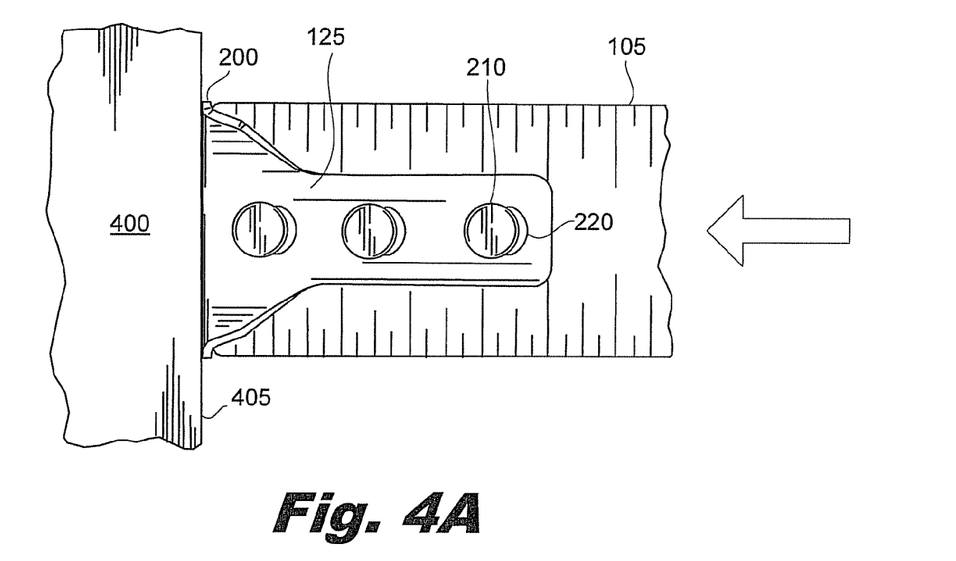
FIGS. 4A and 4B illustrate a top and a side view, respectively, of an illustrative tape measure making a push measurement, according to one embodiment of principles described herein.
Figure 4B:
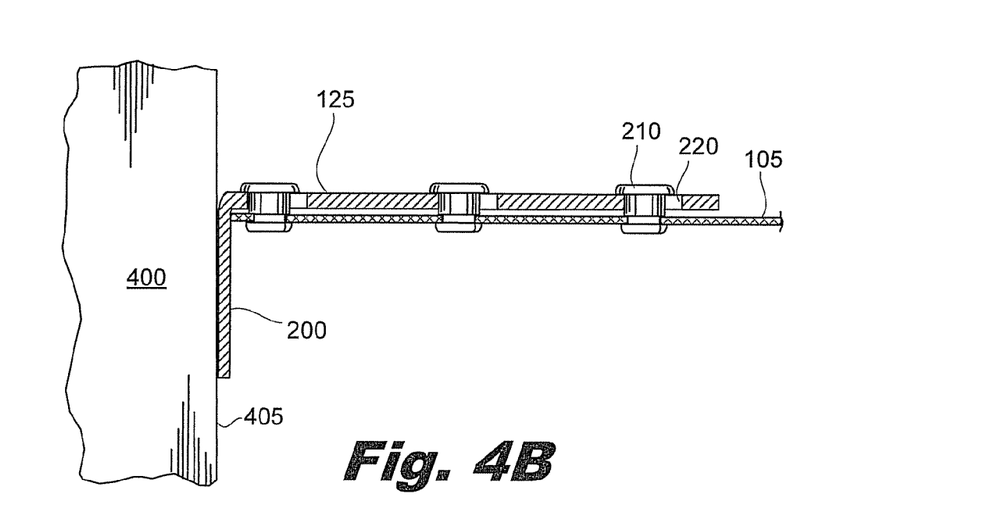

FIGS. 4A and 4B illustrate a top and a side view, respectively, of a tape measure making a push measurement. In a push measurement, the outside of the hook (200) is pushed against a reference surface (405) of an object (400). The flexible tape (105) and attached rivets (210) slide in the elongated holes (220) until the rivets contact a second end of the elongated holes. The end hook (125) is then fully retracted with respect to the flexible tape (105). In this configuration, the tape measure (100) is designed to precisely make a push measurement from the reference plane (405) to any point along the flexible tape (105). Typically a small amount of compressive force is maintained during a push measurement to ensure that the outer surface of the hook (200) remains in contact with reference surface (405) and that the rivets remain firmly engaged with the second end of the elongated holes (220).

Ideally, the elongated holes (220) allow for the tang (205) to slide a distance that is equivalent to the thickness of the hook (200). In this way, both push and pull measurements are precise. In a pull measurement, the tang (205) slides parallel away from the flexible tape (105) a distance equivalent to the thickness of the hook (200) by means of loose rivets (210) and elongated holes (220) in the tang (205). Thus, the measured distance is the length of the tape (105) adjusted by the sliding of the tang to compensate for the thickness of the hook (200). In a push measurement, the flexible tape (105) slides toward the hook a distance equivalent to the thickness of the hook (200). Therefore, the measured distance is still the length of the tape (105) adjusted by the sliding of the tang to compensate for thickness of the hook (200). Ideally, the tape measure is calibrated to give a valid measurement at any point along the flexible tape (105) in both the pull and push configurations.

However, a variety of factors could contribute to mechanical inaccuracies in tape measure readings. For example, the hook (200) may become distorted or bent. By way of example and not limitation, the hook (200) dimensions may become bent by repeated impact with the housing as the tape is recoiled, by impact with other tools, or when the tape measure is dropped. In situations where accuracy and precision of the tape measure are desired, such as precision woodworking, an inaccurate tape measure can cause significant problems. Where two carpenters are working cooperatively to complete a project using their individual tape measures, the tape measures should be calibrated to reduce measurement errors. For example, a first carpenter may measure an opening for crown molding using a push measurement using a first tape measure. The first carpenter communicates the result of the push measurement to the second carpenter who uses a second tape measure to make a pull measurement across the length of the molding, which is to be cut and installed in the opening. If either of the measured values is invalid, the desired fit of the molding will not be achieved. However, if both tape measures are correctly calibrated for both push and pull measurements, then both of the measurements will be valid. The communication of measurements between the two carpenters will be effective and achieve the desired result.

Figure 5A:
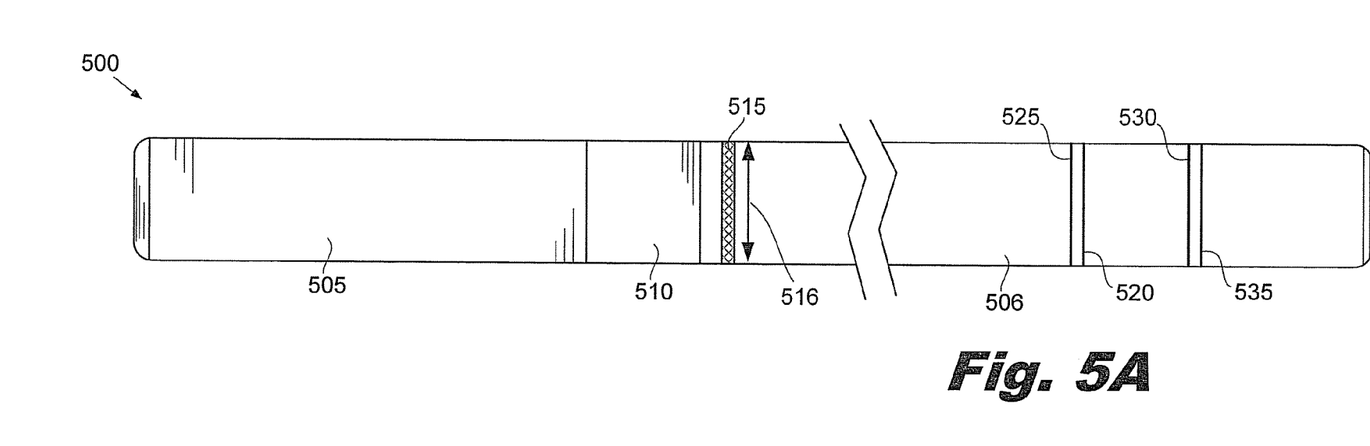
FIGS. 5A and 5B show a top and a side view, respectively, of an illustrative precision tape measure calibrator, according to one embodiment of principles described herein.
Figure 5B:
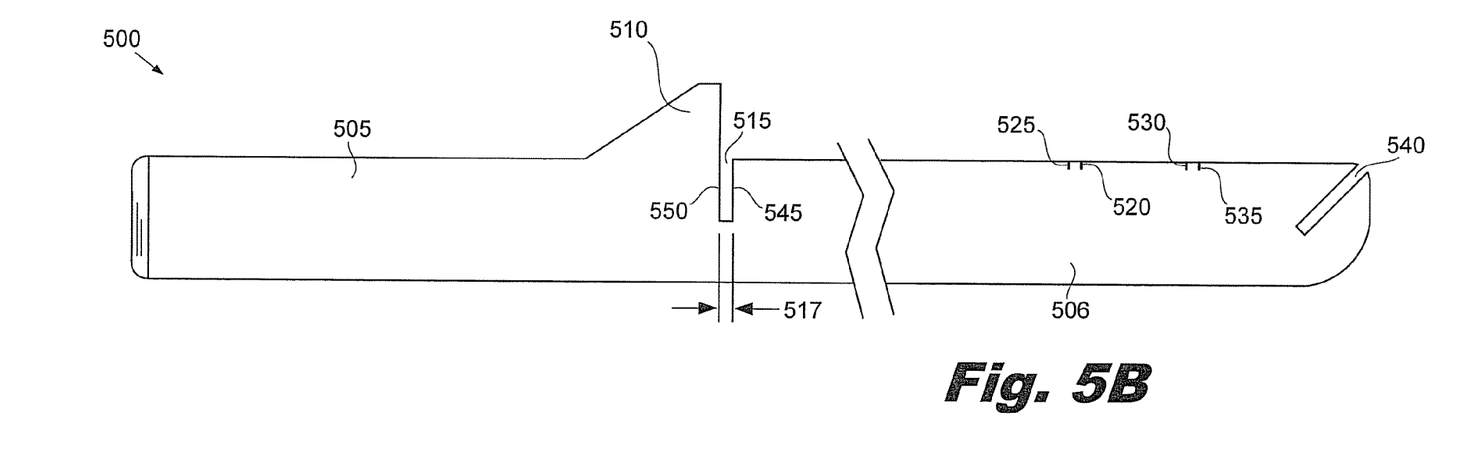

FIGS. 5A and 5B illustrate a top and a side view, respectively, of an illustrative precision tape measure calibrator (500). According to one illustrative embodiment, the tape measure calibrator (500) comprises a generally rectangular body, with the length of the calibrator (500) being larger than the height or the width. The tape measure calibrator (500) includes a handle portion (505) and a base portion (506). The handle (505) provides a gripping surface while the base (506) contains features which allow the calibration of a tape measure. The handle (505) is optional. For example, where the precision tape measure calibrator (500) is permanently mounted, the handle (505) may be omitted.

The base (506) of the calibrator (500) includes a stop (510), a hook slot (515) having a first reference surface (545) and a second reference surface (550), a number of precision calibration lines (520, 525, 530, 535) and a hook adjustment slot (540). The hook slot (515) has a length (516) and a width (517). The length (516) and width (517) of the hook slot (515) are designed to accommodate the majority of end hook designs. The end hook designs vary from manufacturer to manufacturer and from measuring tape to measuring tape. According to one illustrative embodiment, the length (516) of the hook slot (515) is sufficiently large so that the hook portion of the end hook can fit entirely within the slot. The width (517) of the hook slot (515) is wider than that thickness of the hooks of most end hooks so that the end hooks may be easily inserted into the slot.

The distance between a pull calibration line (520) and the first reference surface (545) of the slot (515) is equal to the distance between a push calibration line (525) and a second reference surface (550) of the hook slot (515). According to one illustrative embodiment, the distance between the pull calibration line (520) and the push calibration line (525) is substantially equal to the width of the hook slot (515).

The calibrator may also have any number of additional reference marks (530, 535). For example, other reference marks may be included to allow convenient calibration of a metric tape measure. In another illustrative embodiment, additional reference marks may be included to allow for the calibration of the tape measure at two different distances. If the tape measure is accurate at two different distances, the user can have more confidence that the tape measure is accurate along its entire length.

Figure 6A:
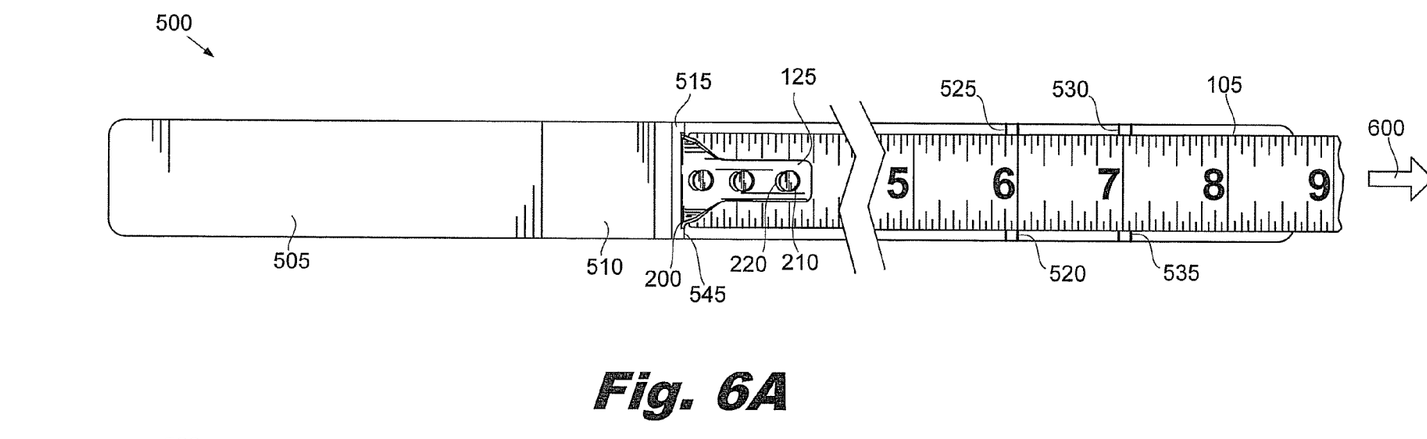
FIG. 6A shows an illustrative precision tape measure calibrator making pull calibration, according to one embodiment of principles described herein.

FIG. 6A illustrates a top view of the precision tape calibrator (500) making pull calibration. The hook (200) of tape measure (100) is inserted into the hook slot (515). The tape (105) is then pulled to the right as indicated by the arrow (600). As described above with reference to making a pull measurement, the rivets (210) attached to the flexible tape (105) slide in the elongated holes (220) until the rivets (210) contact the end of the elongated holes (220). The inner surface of the hook (200) is pulled against the first reference surface (545). This is the measurement position for a pull measurement. The linear graduations on the tape (105) are then compared to a pull calibration line (520). In this case, the tape calibrator (500) is configured such that there is a distance of six inches between the first reference surface (545) and the pull calibration line (520). The pull calibration mark (520) is compared to the corresponding mark on the tape. If the tape measurement is also six inches, the tape measure is correctly calibrated for a pull measurement of six inches.

Figure 6B:
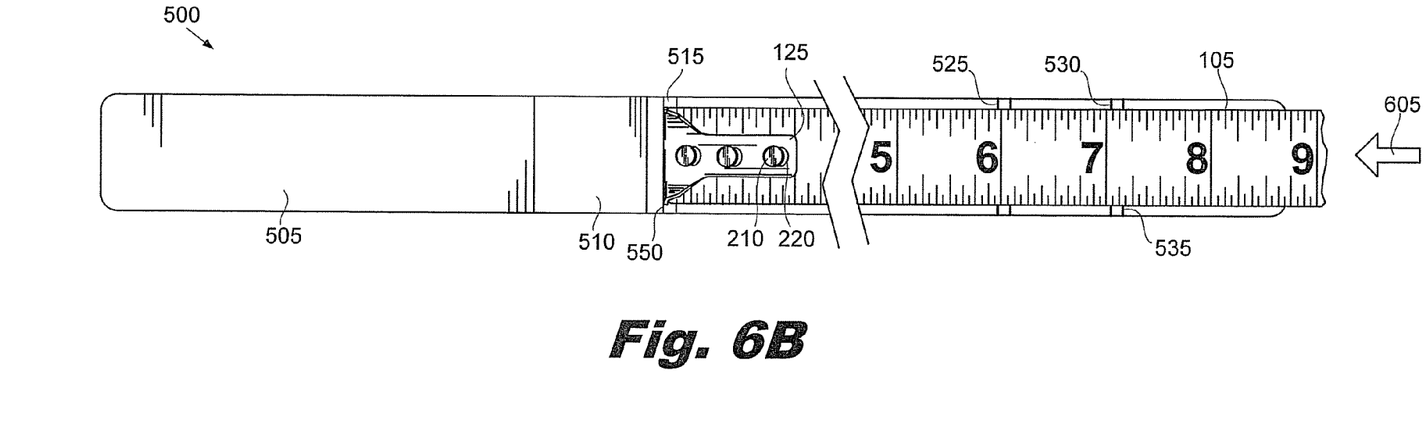
FIG. 6B shows an illustrative precision tape measure calibrator making push calibration, according to one embodiment of principles described herein.

FIG. 6B illustrates a top view of precision tape calibrator (500) making push calibration. To make the corresponding push calibration, the tape (105) is then pushed to the left as indicated by the arrow (605). The outer surface of the hook (200) is pushed into contact with the second reference surface (550) and the rivets (210) slide in the elongated holes (220) until the rivets (210) contact the opposite end of the elongated holes (220). This is the measurement position for a push measurement. The linear graduations on the tape (105) are then compared to the push calibration line (525). The distance between the first reference surface (550) and the first reference line (525) is again six inches. If the tape measurement is also six inches, the tape measure is correctly calibrated for a push measurement of six inches. However, in this case, the tape measure reports a measurement of less than six inches. Consequently, this tape measure is not correctly calibrated for making a push measurement. The inaccuracy of the tape measure may result from a deformation in the end hook (125). For example if a portion of the end hook (125) were outwardly bent, the bent portion would prevent the end hook (125) from being pressed flush with the second reference surface (550). As mentioned above, damage to the end hook (125) by rough handling or accident is a common source of error in tape measures.

Figure 7:
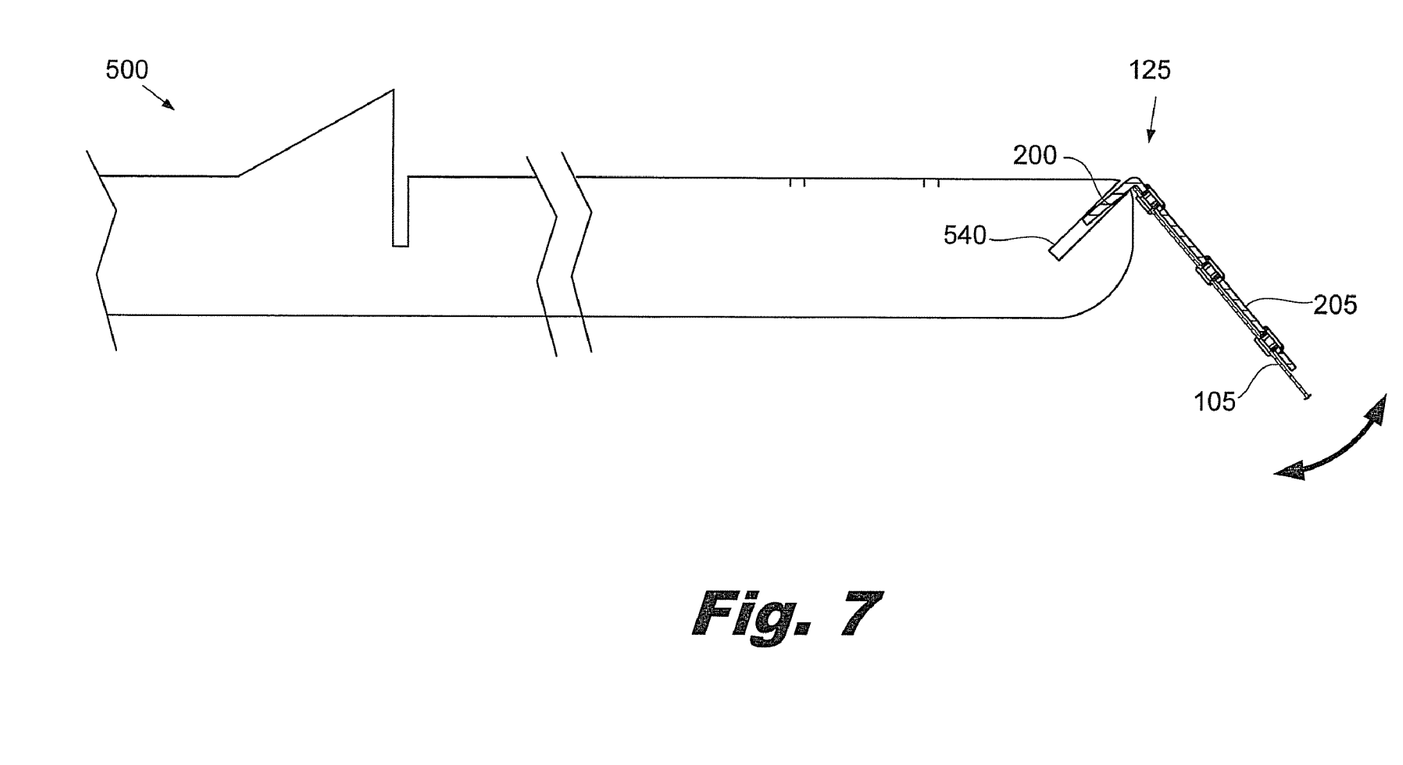
FIG. 7 is an illustrative precision tape measure calibrator adjusting the hook angle, according to one embodiment of principles described herein.

FIG. 7 shows an illustrative precision tape calibrator (500) with an adjustment slot (540) for adjusting the hook geometry, according to one exemplary embodiment. The hook portion (200) of the end hook (125) is inserted into the hook adjustment slot (540). The precision tape calibrator (500) is held in one hand, while the other hand grasps the tang (205) and flexible tape (105). The hook geometry is then adjusted by applying pressure to the tang (205) and flexible tape (105) such that the angle of the all or part of the hook (200) is changed. The particular direction and amount of adjustment can be guided by a visual inspection of the end hook (125), a measurement of the hook geometry, or the result of a calibration. Following the adjustment of the end hook (125), the calibration procedure described above with respect to FIG. 5 could be repeated to ascertain if the desired result was achieved.

In circumstances where the desired calibration cannot be achieved, the tape measure can be discarded or designated for use in non-critical applications only. For example, where substantial wear has changed the fit of the rivets in the elongated holes in the tang body, adjustment of the hook geometry will be ineffective in achieving valid measurements.

According to one illustrative embodiment, a variety of accessories could be associated with the precision tape calibrator. By way of example and not limitation, the accessories could include a pencil sharpener, a leveling vial, a digital inclinometer, or a laser pointer. These accessories could be attached or imbedded into the body of the precision tape calibrator. For example, a pencil sharpener may allow a user to conveniently sharpen a pencil for making precise marks. A leveling vial or a digital inclinometer could be used to make angle measurements of various surfaces. When a leveling vial or digital inclinometer is combined with a laser pointer, the measured angle could be projected at a distance.

Figure 8:
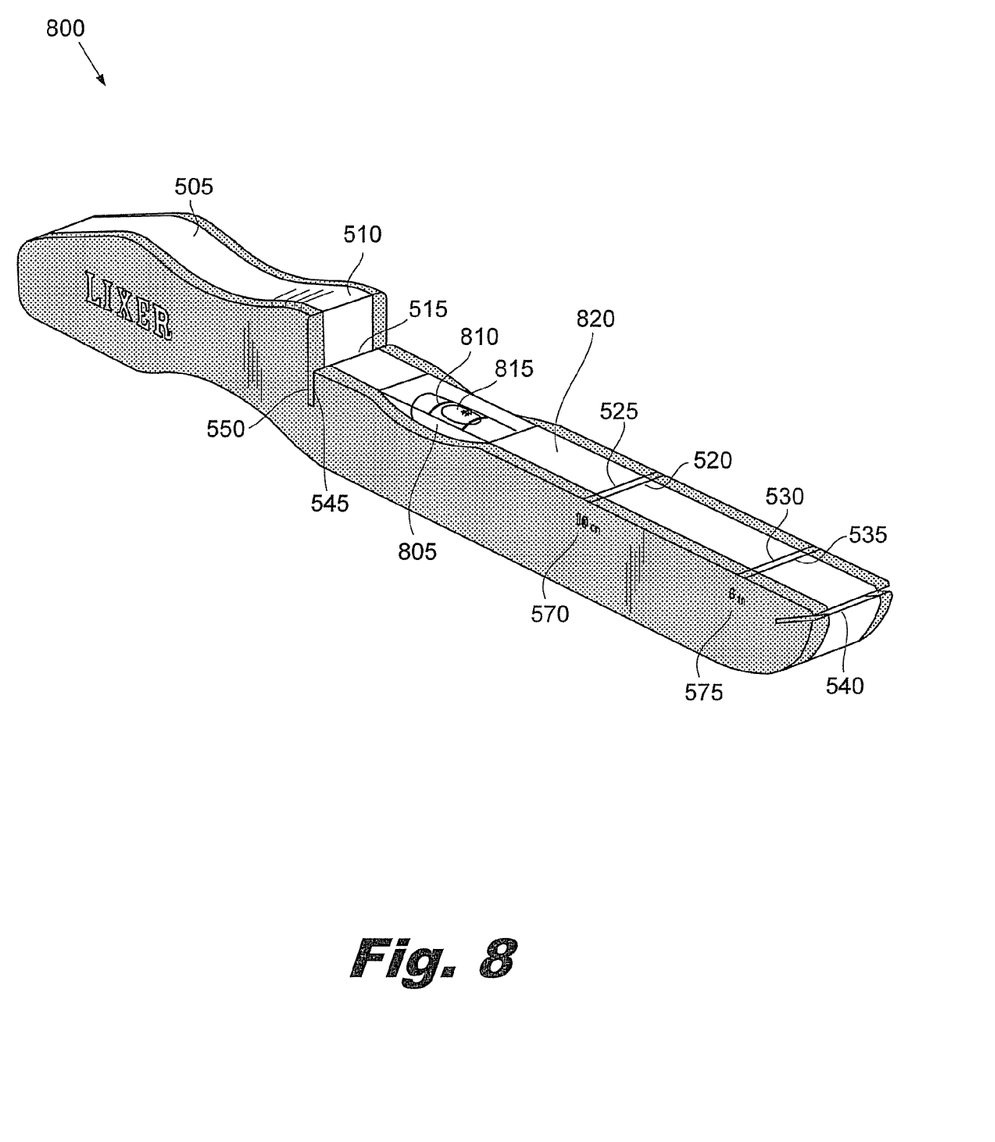
FIG. 8 is a perspective view of an illustrative precision tape measure calibrator, according to one embodiment of principles described herein.

FIG. 8 is a perspective view of an illustrative precision tape measure calibrator (800). According to one illustrative embodiment, the precision tape measure calibrator (800) includes a handle (505) and a slot (515) which forms the first calibration surface (545) and a second calibration surface (550). An integral stop (510) also forms a portion of the second calibration surface (550). On a top surface (820) there are a number of calibration marks (520, 525, 530, 535). According to one illustrative embodiment, a first group (570) of two calibration marks (520, 525) are placed 10 cm from their respective calibration surfaces. A second group (575) of two calibration marks (530, 535) are placed 6 inches from their respective calibration surfaces.

In this illustrative embodiment, the precision tape measure calibrator (800) may include a spirit level. According to one illustrative embodiment, the spirit level is a bubble vial (805) which is inset into the upper surface (820) of the precision tape measure calibrator (800). The bubble vial (805) includes a slightly upward curving bubble vial, a bubble (815) which rises to the upper most point in the bubble vial, and calibration lines (810). The bubble vial (805) can be used to measure the inclination of a surface upon which the precision tape measure calibrator (800) is placed. When the precision tape measure calibrator (800) is placed on a substantially horizontal surface, the bubble (815) should be centered between the two calibrations lines (810). Because the bubble (815) is centered in the upper most point in the bubble vial, placing the precision tape measure calibrator (800) on an inclined surface causes the bubble (815) to move away from the center of the bubble vial. The relative location bubble (815) with respect to the calibration lines (810) provides an indication of the degree of inclination of the measured surface.

Figure 9:
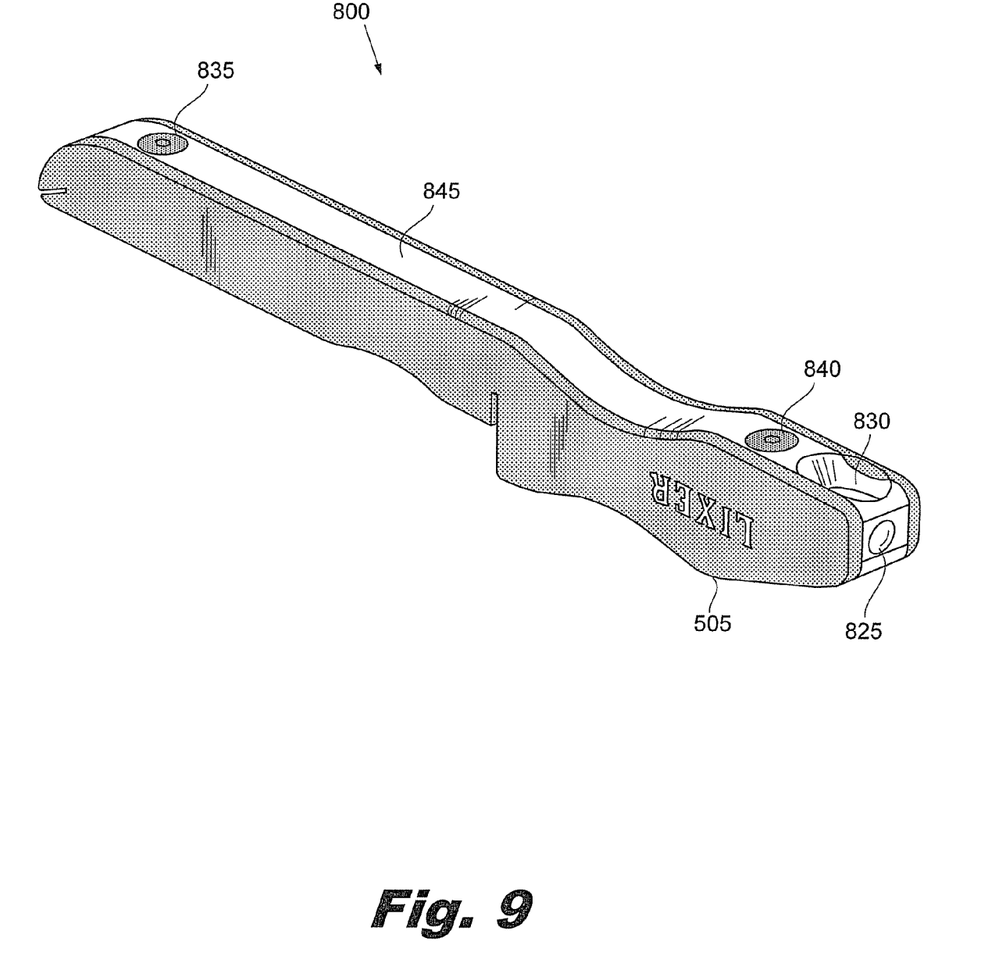
FIG. 9 is a perspective view of an illustrative precision tape measure calibrator, according to one embodiment of principles described herein.

FIG. 9 is a perspective view of the underside of the illustrative precision tape measure calibrator (800). According to one illustrative embodiment, the precision tape measure calibrator (800) includes two level adjustment feet (835, 840) which define a reference plane for making a level measurement using the bubble vial (805; FIG. 8). The level adjustment feet (835, 840) may be screwed into or out of the bottom surface (845) of the precision tape measure calibrator (800) to calibrate the bubble location within the bubble vial. For example, the precision tape measure calibrator (800) may be placed on a horizontal calibration surface and the location of the bubble (815, FIG. 8) within the bubble vial (805, FIG. 8) is noted. If the bubble is not centered between the calibration marks (810, FIG. 8) to the desired degree of accuracy, one or more of the level adjusting feet (835, 840) can be rotated into or out of the bottom surface (845). The precision tape measure calibrator (800) will then rest at a new angle with respect to the horizontal calibration surface. Consequently, the bubble (815, FIG. 8) will move to a new location within the bubble vial (805, FIG. 8) when placed on the horizontal calibration surface.

A similar method can be used to calibrate the bubble vial (805, FIG. 8) within the precision tape measure calibrator (800) to other angles. For example if an angle of one degree from the horizontal is desired, the precision tape measure calibrator (800) can be placed on a calibration surface which has an inclination of one degree. The level adjustment feet (835, 840) can be adjusted until the bubble is centered within the calibration marks. The workman will then know that when the inclination of a surface is measured using the precision tape measure calibrator, an inclination of one degree will result in the bubble (815, FIG. 8) being centered within the calibration marks (810, FIG. 8). For example, a plumber could preset the precision tape measure calibrator to a pipe drainage slope. This would allow the plumber to more quickly install the pipe at the desired angle.

According to one illustrative embodiment, the precision tape measure calibrator (800) may include a number of other features. For example, the precision tape measure calibrator (800) may include a pencil sharpener (825). In the embodiment shown in FIG. 9, the pencil sharpener (825) is inset into the handle (505) of the precision tape measure calibrator (800). The pencil is inserted into the circular aperture on the end of the handle and rotated to sharpen the pencil tip. The shavings exit the pencil sharpener (830) through a bottom aperture (830). The incorporation of a pencil sharpener (830) into the precision tape measure calibrator (800) can be a convenient way to increase the accuracy of the markings made during measuring or laying out a design. The sharpened pencil tip will make a narrower, and consequently more precise, line on the measured material. In many instances, a workman may desire to sharpen his marking pencil in conjunction with calibrating his tape measure. Consequently, incorporating a pencil sharpener (825) into the precision tape measure calibrator (800) can reduce the time and effort for the workman to improve the accuracy of his measurements and markings. For example, when marking abrasive surfaces, the point of marking pencils can quickly wear away. Having a pencil sharpener conveniently available allows the marking pencil to be regularly sharpened.

The precision measuring tape calibrators shown in FIG. 5A through FIG. 9 are illustrative embodiments presented as examples of the principles described. A variety of other geometries could be used. By way of example and not limitation, an apparatus for calibrating a tape measure may include a base with a first reference surface and a second reference surface. A pull calibration mark is made on the base which indicates a first distance from the first reference surface. A push calibration mark is also made on the base which indicates a second distance from the second reference surface. According to one illustrative embodiment, the first distance and the second distance are substantially equal. Additionally, the first reference surface and the second reference surface may be mutually parallel offset planes, which are separated by an offset width, the pull calibration mark and the push calibration mark being separated by a distance which is substantially equal to the offset width. Where the first reference surface and second reference surface are the sides of a slot, the offset width is equivalent to the width of the slot.

Additional calibration marks can also be included on the base to calibrate the measuring tape at different distances. For example, second set of calibration marks which include an additional pull calibration mark and an additional push calibration mark can be included on the base. These additional marks may be mutually separated by a distance which is substantially equal to the offset width.

According to one illustrative embodiment, the reference surfaces may be formed by cutting a slot in the base. As described above, the first reference surface may be a first sidewall of the slot and the second reference surface may be a second sidewall of the slot. In one embodiment, the second reference surface is substantially larger than the first reference surface and forms a stop which directs an end hood of a tape measure into the slot. A number of other geometries could be used to form the reference surfaces and calibration marks.

Figure 10A:
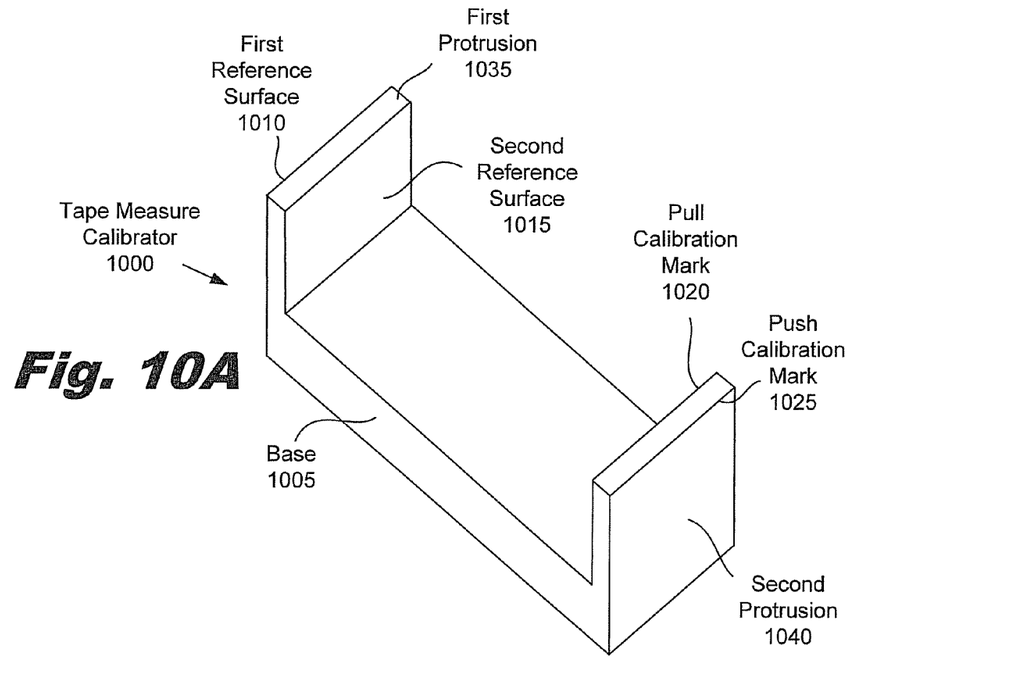
FIGS. 10A and 10B are perspective views of illustrative precision tape measure calibrators, according to one embodiment of principles described herein.

FIG. 10A is a perspective view of an illustrative measuring tape calibrator (1000). According to one illustrative embodiment, the measuring tape calibrator (1000) includes a base (1005). Two protrusions (1035, 1040) extend upward from the base. One side of a first protrusion (1035) forms the first reference surface (1010) and the other side of the first protrusion (1035) forms the second reference surface (1015). Edges on a second protrusion (1040) form pull calibration mark (1020) and push calibration mark (1025). According to one illustrative embodiment, the first protrusion (1035) and the second protrusion (1040) have substantially the same height and thickness.

Figure 10B:
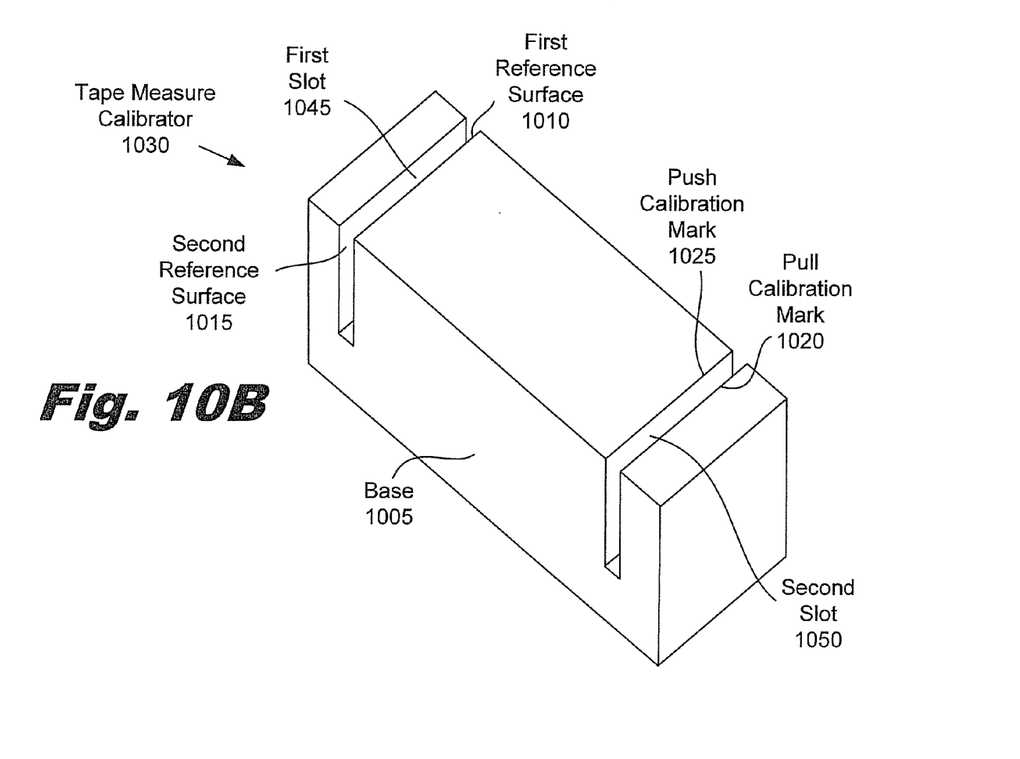

FIG. 10B is a perspective view of an illustrative measuring tape calibrator (1030). According to one illustrative embodiment, the measuring tape calibrator (1030) includes a base (1005). Two slots (1045, 1050) are formed in the base (1005). One side of a first slot (1045) forms the first reference surface (1010) and the other side of the first slot (1045) forms the second reference surface (1015). Edges on the second slot (1050) form pull calibration mark (1020) and push calibration mark (1025). According to one illustrative embodiment, the first slot (1045) and the second protrusion (1050) have substantially the same width and orientation.

The measuring tape calibrator (1000, 1030) may be made from a variety of materials. According to one illustrative embodiment, the tape measure calibrator may be made from materials which have relatively high dimensional stability. For example, the base may be made from a nickel steel alloy, such as INVAR. One characteristic of INVAR is that it has a very low coefficient of thermal expansion. Consequently, a measuring tape calibrator made from INVAR may exhibit smaller changes in size as a result of temperature changes. Additionally, it may be desirable for the measuring tape calibrator to be made from a material which is substantially similar to the materials which make up the tape measure. For example, the graduated tape and measuring tape calibrator may be made from a spring steel.

The tape measure calibrator may also be a composite of several materials. By way of example and not limitation, the tape measure calibrator may be made from several pieces of wood which are laminated together.

A variety of techniques can be used to increase the accuracy and ease of use of a tape measure calibrator. By way of example and not limitation, when an edge forms a calibration mark, the edge may be left sharp rather than beveled. This can assist the user in making comparing the linear graduations on the tape measure by presenting a single, high contrast line. Additionally, various portions of the measuring tape calibrator can be marked or painted to insure accurate identification of various reference surfaces and calibration marks.

Figure 11:
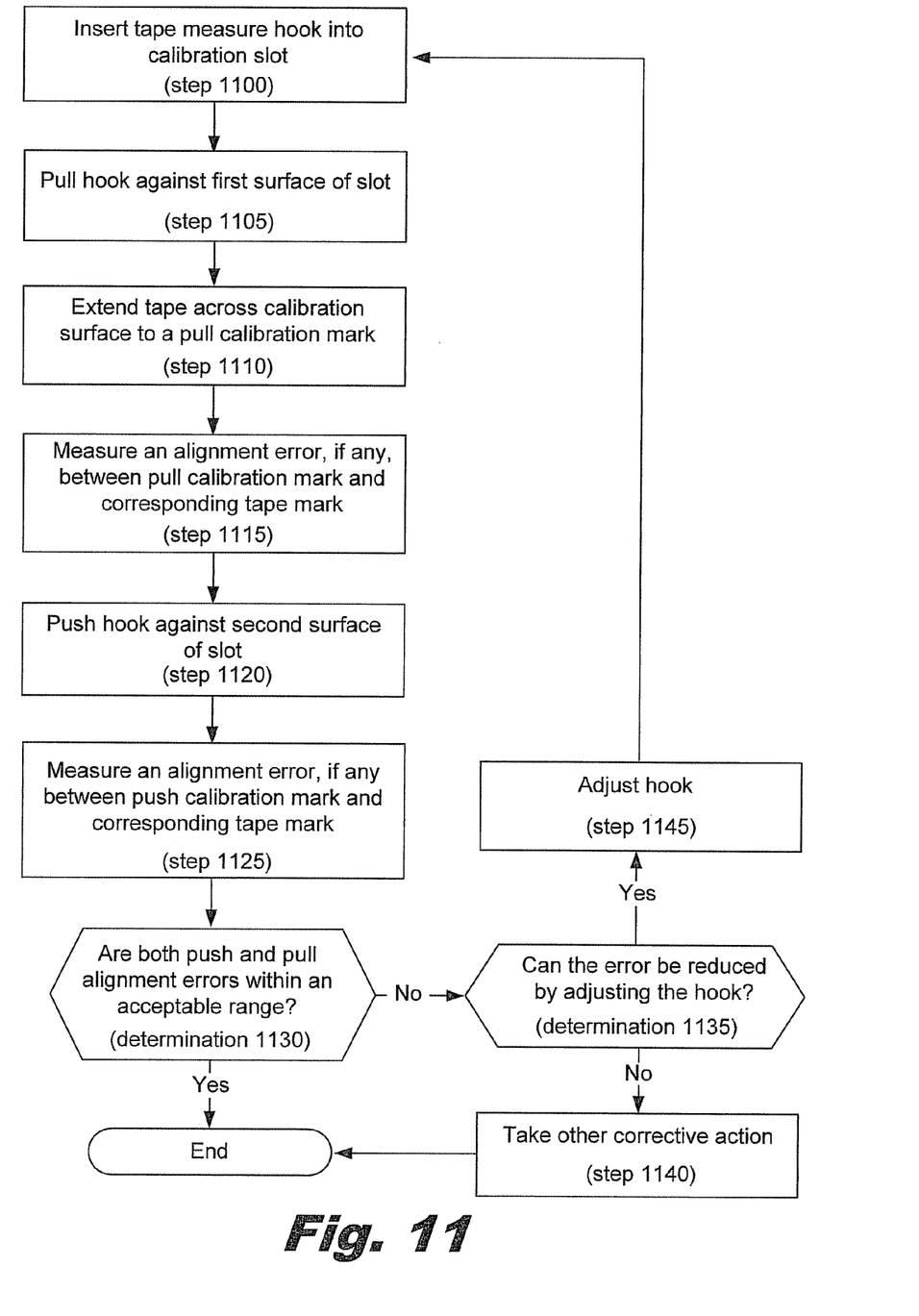
FIG. 11 is a flow chart of an illustrative method for using a precision tape measure calibrator to calibrate a tape measure, according to one embodiment of principles described herein.

FIG. 11 is a flow chart of an illustrative method for using a precision tape measure calibrator to calibrate a tape measure. According to one illustrative embodiment, the tape measure hook is inserted into the calibration slot in the precision tape measure calibrator (step 1100). The hook is then pulled against a first surface of the slot (step 1105). The tape is then extended across a calibration surface to a pull calibration mark (step 1110). The pull measurement error, if any, is measured between the pull calibration mark and a corresponding mark on the measuring tape (step 1115). The hook is pushed against a second reference surface of the slot (step 1120). The push measurement error, if any, is measured between a push calibration mark and a corresponding tape mark (step 1125).

A determination is made whether both push and pull measurement errors are within an acceptable range (determination 1130). If the push and pull measurement errors are within an acceptable range, the calibration process ends. The acceptable range may be determined by the individual or organization which uses the tape measure. According to one illustrative embodiment, the desired dimensional accuracy of a product may drive the acceptable range. For example, if the production of a product which has a length with an allowable error of 1/32 of an inch is desired, the acceptable range for push and pull measurement errors may be plus or minus 1/64 of an inch.

However, if one or both of the measurement errors are not within an acceptable range, is it then determined if the error can be reduced by adjusting the hook (determination 1135). If the error can not be reduced by adjusting the hook, other corrective action can be taken (step 1140). For example, the other corrective actions may include tightening the rivets, marking the defective tape measure as out of calibration, or discarding the defective tape measure. However, if the measurement error can be reduced or eliminated by adjusting the hook, the hook is inserted into the adjustment slot in the precision tape measure calibrator and adjusted (step 1145). The calibration process is then repeated to determine if the adjustment resulted in the desired reduction in the measurement error of the tape measure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An apparatus for calibrating a tape measure comprising:
    a base,
    a slot formed in the base, the slot having a first reference surface and a second reference surface and being configured to receive a hook of a tape measure; the hook being pulled against the first reference surface during a pull measurement and the hook being pressed against the second reference surface during a push measurement;
    a pull calibration mark, the pull calibration mark indicating a first distance from the first reference surface, a corresponding mark on the tape measure being compared to the pull reference mark to determine a pull measurement error; and
    a push calibration mark, the push calibration mark indicating a second distance from the second reference surface, the corresponding mark on the tape measure being compared to the push calibration mark to determine a push measurement error;
    in which the first distance and the second distance are substantially equal.

2. The apparatus of claim 1, in which the apparatus further comprises an adjustment slot formed in the base, the adjustment slot being configured to receive the hook.

3. The apparatus of claim 1, in which the first reference surface and the second reference surface are planar surfaces of sufficient size to contact substantially all of the front surface and back surface of the hook.

4. The apparatus of claim 1, in which the length of the slot is greater than the hook is wide.

5. The apparatus of claim 1, in which the width of the slot is greater than the thickness of substantially all hooks used on tape measures, such that substantially all hooks fit into the slot.

6. The apparatus of claim 1, in which the second reference surface is larger than the first reference surface.

7. The apparatus of claim 1, in which the sides of the slot are the first calibration surface and the second calibration surface.

8. The apparatus of claim 1, further comprising an integrated pencil sharpener.

9. The apparatus of claim 1, further comprising an integrated spirit level.

10. The apparatus of claim 9, in which the integrated spirit level is a bubble level, the apparatus further comprising adjustable leveling feet configured to calibrate the apparatus to the bubble level.

11. A method for calibrating a tape measure comprising:
    placing a hook in a slot, the hook being slidably attached to a flexible tape of the tape measure, the slot comprising a first reference surface and a second reference surface;
    pulling the flexible tape to bring the hook into contact with the first reference surface, thereby sliding the end hook to full extension with respect to the flexible tape;
    comparing a linear graduation on the flexible tape to a pull calibration mark to obtain a pull measurement error;
    pushing the flexible tape to bring the hook into contact with the push reference surface, thereby sliding the end hook to full retraction with respect to the flexible tape; and
    comparing a linear graduation on the flexible tape to a push calibration mark to obtain a push measurement error.

12. The method of claim 11, further comprising:
    determining if the pull measurement error and push measurement error within an acceptable range; and
    if either the pull measurement error or the push measurement error are not within an acceptable range, then determining if the error can be reduced by adjusting the end hook.

13. The method of claim 11, further comprising:
    making adjustments to the hook; and
    recalibrating the tape measure to determine if the tape measure has a pull measurement error and a push measurement error within an acceptable range.

* * * * *